(12) United States Patent
Lanie et al.

(10) Patent No.: US 10,774,830 B2
(45) Date of Patent: Sep. 15, 2020

(54) SELF-LUBRICATING PUMP THROAT SEAL (71) Applicant: Graco Minnesota Inc., Minneapolis, MN (US)

(72) Inventors: Jesse L. Lanie, Ihlen, MN (US); Dustin A. Tichy, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 198 days.

(21) Appl. No.: 15/944,067

(22) Filed: Apr. 3, 2018

(65) Prior Publication Data
US 2019/0301448 A1 Oct. 3, 2019

(51) Int. Cl.
| F04B 53/18 | (2006.01) |
| F01M 1/02 | (2006.01) |
| F04B 53/14 | (2006.01) |
| F04B 23/02 | (2006.01) |
| F16N 19/00 | (2006.01) |
| F04B 53/06 | (2006.01) |
| F04B 9/123 | (2006.01) |

(Continued)

(52) U.S. Cl.
CPC ............... *F04B 53/18* (2013.01); *F01M 1/02* (2013.01); *F04B 9/123* (2013.01); *F04B 9/125* (2013.01); *F04B 9/1222* (2013.01); *F04B 17/04* (2013.01); *F04B 23/025* (2013.01); *F04B 23/026* (2013.01); *F04B 39/0284* (2013.01); *F04B 53/06* (2013.01); *F04B 53/143* (2013.01); *F04B 53/16* (2013.01); *F16N 13/06* (2013.01); *F16N 19/00* (2013.01); *F16N 29/02* (2013.01)

(58) Field of Classification Search
CPC ...... F04B 53/18; F04B 23/025; F04B 9/1222; F04B 9/123; F04B 9/1256; F04B 23/026; F04B 39/0284; F16N 13/06; F16N 13/16; F16N 2013/063; F16N 2013/066; F16N 19/00; F16N 7/38; F16N 13/18; F01M 2001/0253; F01M 2001/023; F01M 2001/0269; F01M 2001/062
See application file for complete search history.

(56) References Cited

U.S. PATENT DOCUMENTS 2,010,165 A * 8/1935 Tear .................. F16N 13/10
417/289
2,590,036 A 3/1952 Potts
(Continued)

FOREIGN PATENT DOCUMENTS

CN 103429946 A 12/2013
CN 204941912 U 1/2016
(Continued)

OTHER PUBLICATIONS

First Chinese Office Action for CN Application No. 201910268325.0, dated Jun. 1, 2020, pp. 18.

*Primary Examiner* — Bryan M Lettman
*Assistant Examiner* — Timothy P Solak
(74) *Attorney, Agent, or Firm* — Kinney & Lange, P. A.

(57) ABSTRACT

A pump housing includes an integral vent flow path extending between a low-pressure region and the reservoir. The vent path provides fluid communication between the downstream side of a throat seal dividing the low-pressure region from a high-pressure region and the reservoir. Lubricant flows through the vent path from the reservoir to the low-pressure region to provide lubrication to the throat seal.

21 Claims, 6 Drawing Sheets

(51) Int. Cl.
*F04B 53/16* (2006.01)
*F04B 39/02* (2006.01)
*F04B 17/04* (2006.01)
*F04B 9/125* (2006.01)
*F04B 9/12* (2006.01)
*F16N 29/02* (2006.01)
*F16N 13/06* (2006.01)

(56) References Cited

U.S. PATENT DOCUMENTS

| | | | |
|---|---|---|---|
| 2,633,082 A | 3/1953 | McFarland | |
| 2,768,587 A | 10/1956 | Corneil | |
| 2,780,312 A * | 2/1957 | Ernest | D04B 35/28 |
| | | | 184/6.3 |
| 2,781,728 A * | 2/1957 | Fischer | F01L 25/066 |
| | | | 417/86 |
| 2,960,185 A * | 11/1960 | Klein | F16N 29/02 |
| | | | 184/7.4 |
| 3,065,704 A | 11/1962 | Hill | |
| 3,070,288 A | 12/1962 | Richards | |
| 3,536,424 A | 10/1970 | Plos | |
| 3,698,726 A | 10/1972 | Schettler | |
| 4,218,961 A | 8/1980 | Huperz et al. | |
| 5,494,420 A * | 2/1996 | Mawhirt | F04B 7/06 |
| | | | 417/499 |
| 5,921,755 A * | 7/1999 | Eldridge | F04B 37/14 |
| | | | 417/255 |
| 8,092,193 B2 | 1/2012 | Larson | |
| 2013/0112073 A1 | 5/2013 | Studt et al. | |
| 2016/0312953 A1* | 10/2016 | Holman | F16N 13/02 |

FOREIGN PATENT DOCUMENTS

| | | |
|---|---|---|
| CN | 206682574 U | 11/2017 |
| DE | 202013105967 U1 | 4/2014 |

* cited by examiner

SELF-LUBRICATING PUMP THROAT SEAL

BACKGROUND

This disclosure relates generally pumps. More particularly, this disclosure relates to lubricated throat seals for lubricant pumps.

Lubricant pumps typically utilize a reciprocating piston to drive a lubricant, such as grease or oil, downstream to lubricant injectors. The piston reciprocates through various seals during operation. Some seals experience a pressure differential, such that a first side of the seal is subjected to the high pressures generated during pumping and the second side experiences relatively low pressures compared to the first side. The low-pressure side of the seal is not exposed to any of the pumped lubricant, and as such, friction builds between the piston and the low-pressure side of the seal. The friction causes the seal to experience increased heat and wear.

SUMMARY

According to one aspect of the disclosure, a lubricant pump includes a housing having a fluid inlet and a fluid outlet, a reservoir mounted on the housing and configured to store a lubricant, a piston having a first end and a second end, a throat seal disposed about the second end of the piston, the throat seal having an upstream face and a downstream face, and a vent path extending through the housing. The piston extends through the housing and is configured to draw lubricant through the fluid inlet and drive the lubricant through the fluid outlet. The vent path is configured to provide a flow path for the lubricant between the reservoir and the downstream face of the throat seal.

According to another aspect of the disclosure, a lubrication system includes a pump, a lubrication line, a lubricant injector disposed on the lubrication line and configured to receive the lubricant from the lubrication line, and a controller. The pump includes a housing having a fluid inlet and a fluid outlet, a reservoir mounted on the housing and configured to store a lubricant, a piston having a first end and a second end, a throat seal disposed about the second end of the piston, the throat seal having an upstream face and a downstream face, and a vent path extending through the housing. The piston extends through the housing and is configured to draw lubricant through the fluid inlet and drive the lubricant through the fluid outlet. The vent path is configured to provide a flow path for the lubricant between the reservoir and the downstream face of the throat seal. The lubrication line extends from the fluid outlet. The controller is configured to alternatingly activate the motor to initiate a pressure cycle and to deactivate the motor to initiate a vent cycle.

According to yet another aspect of the disclosure, a housing for a pump includes an upstream cylinder bore configured to receive an upstream end of a cylinder, a downstream cylinder bore configured to receive a downstream end of the cylinder, a fluid inlet extending between a reservoir receiving portion configured to receive a lubricant reservoir and the upstream cylinder bore, a vent path, a fluid outlet, a pressure path, a vent opening extending between the pressure path and the vent path, and a pressure relief opening extending through the housing between the pressure path and the vent path. The downstream cylinder bore includes a high-pressure region and a low-pressure region. The vent path extends between the reservoir receiving portion and the low-pressure portion. The fluid outlet extends into the high-pressure region. The pressure path extends from the high-pressure region. The vent path is configured to provide unobstructed fluid communication between the reservoir receiving portion and the low-pressure region.

DETAILED DESCRIPTION

Figure 1A:
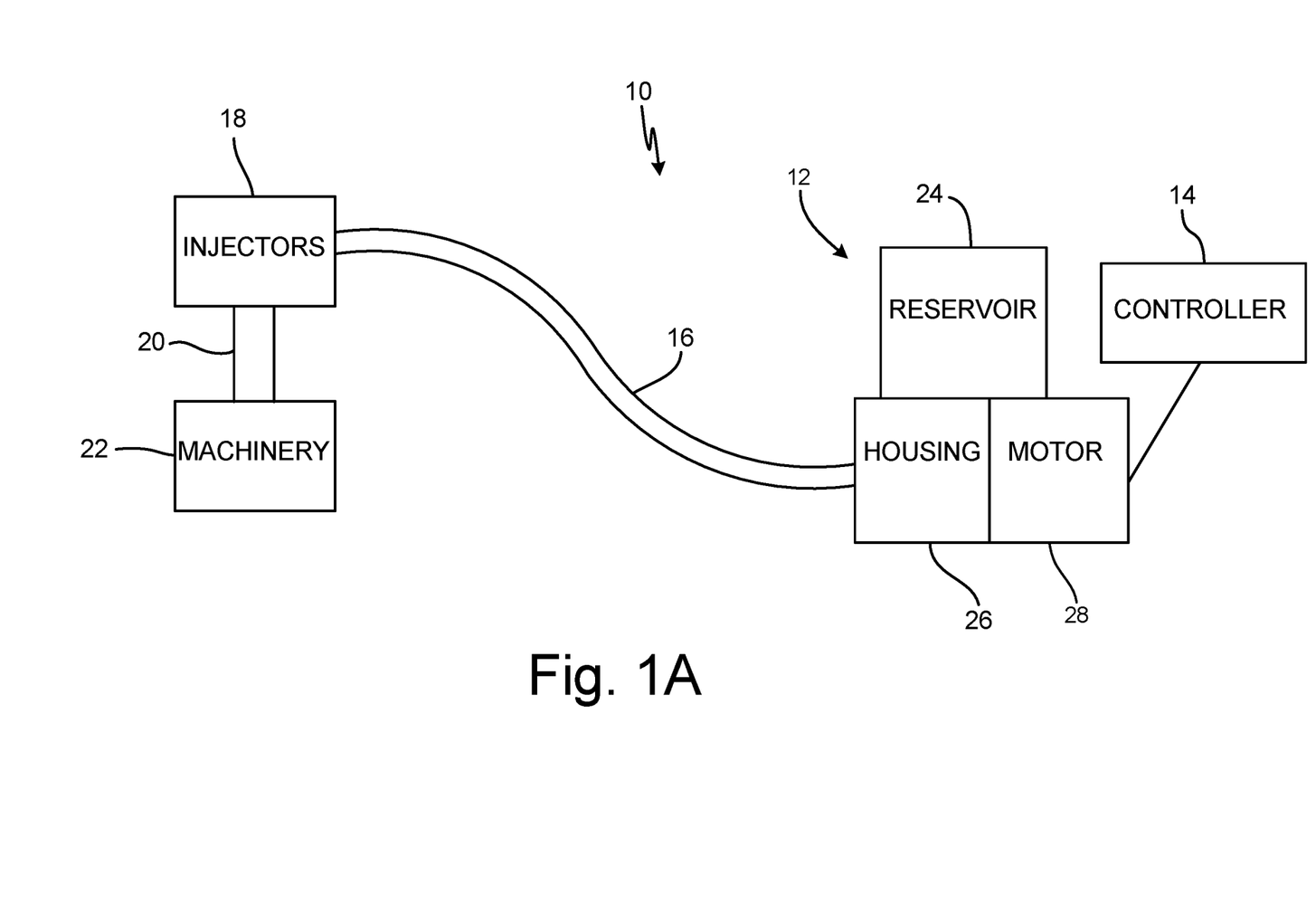
FIG. 1A is a schematic diagram of a lubricant distribution system.
Figure 1B:
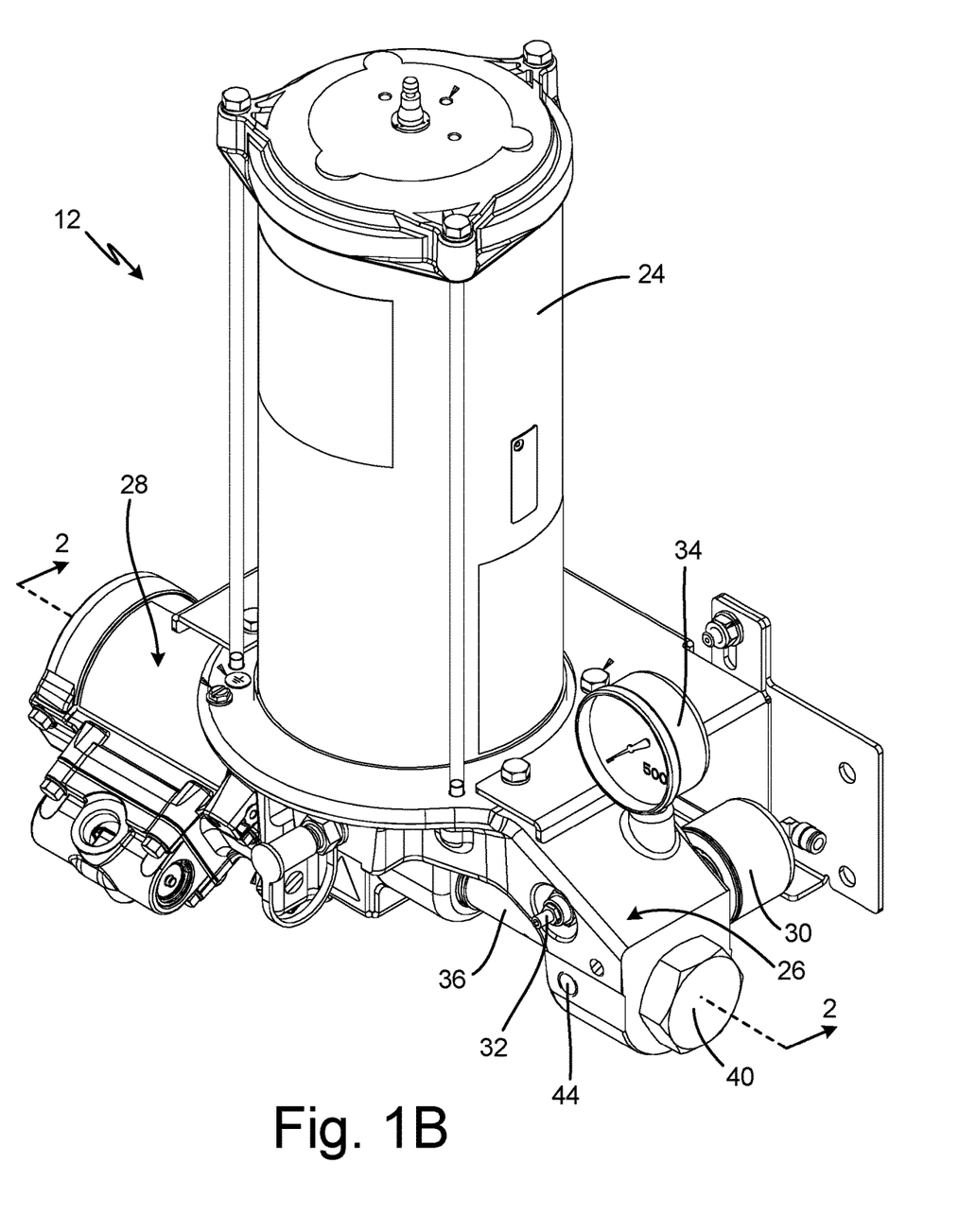
FIG. 1B is an isometric view of a pump.
Figure 1C:
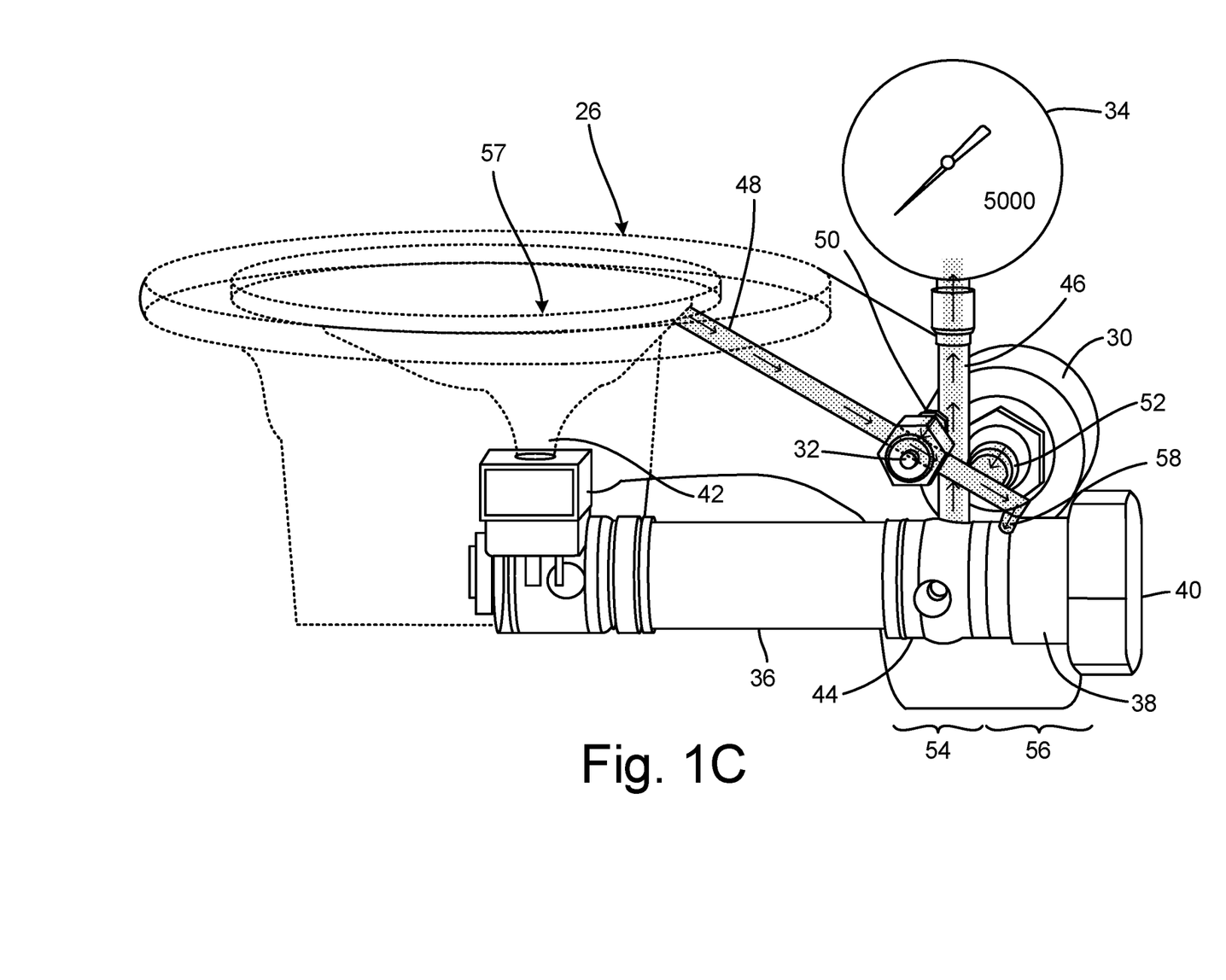
FIG. 1C is an isometric view of the pump with the housing depicted as transparent to show lubricant flowpaths through the housing.
Figure 2A:
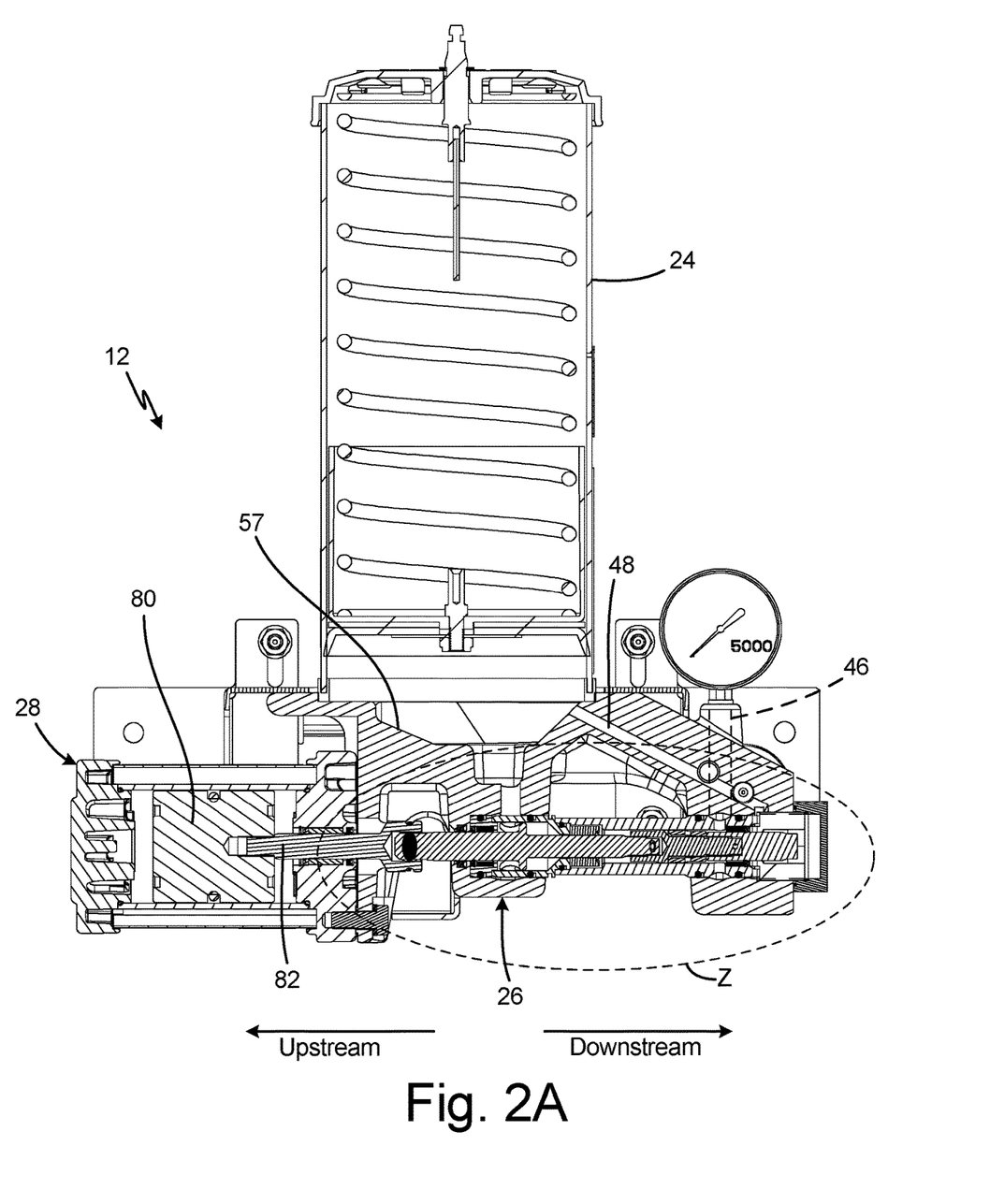
FIG. 2A is a cross-sectional view of the pump of FIG. 1B taken along line 2-2 in FIG. 1B.
Figure 2B:
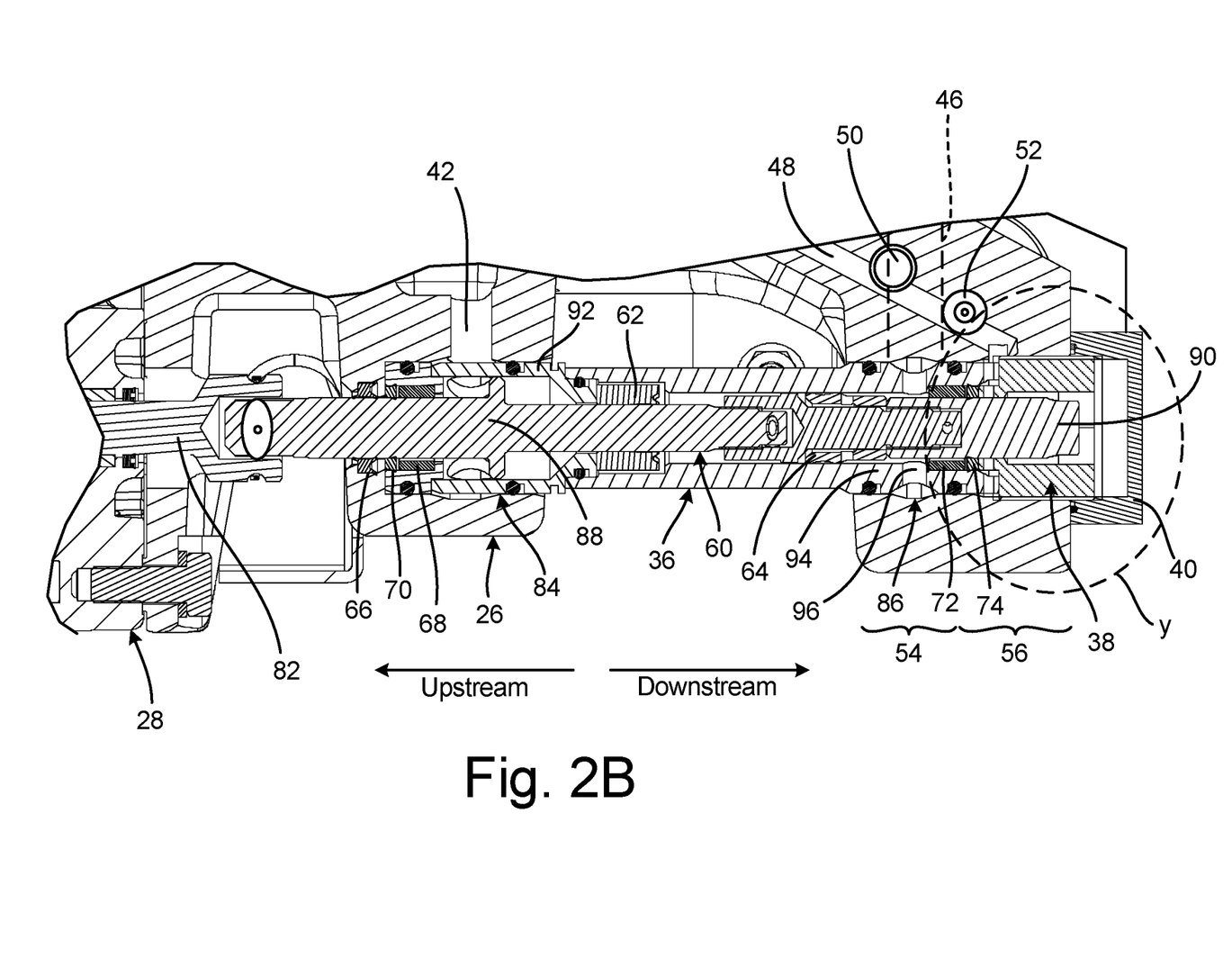
FIG. 2B is an enlarged view of Detail Z in FIG. 2A.
Figure 2C:
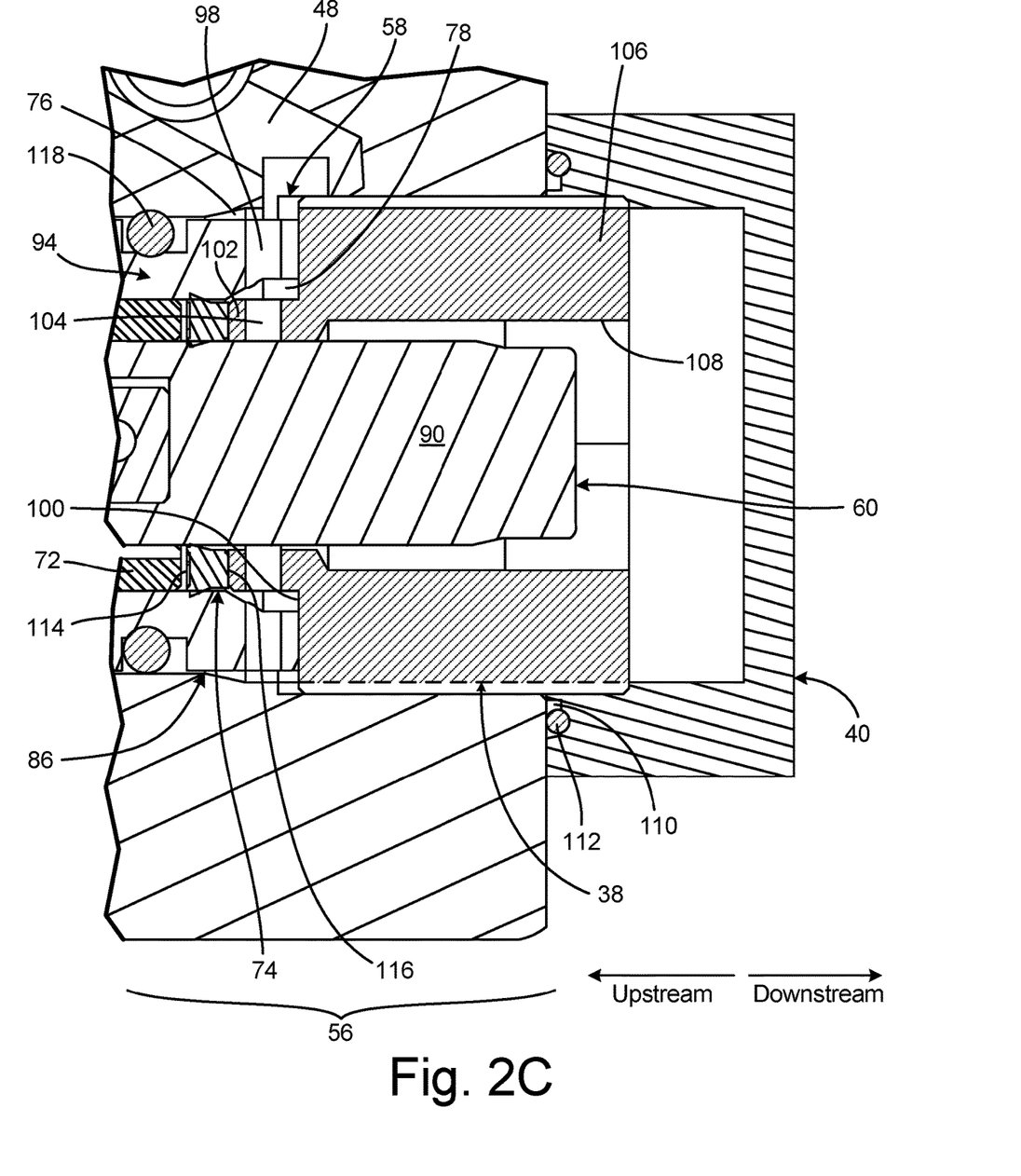
FIG. 2C is an enlarged view of detail yin FIG. 2B.

FIG. 1A is a schematic diagram of lubrication system 10, a system that receives, stores, and supplies lubricant to machinery. FIG. 1B is an isometric view of pump 12. FIG. 1C is an isometric view of pump 12 showing lubricant flowpaths through housing 26 of pump 12. FIGS. 1A-1C will be discussed together. Lubrication system 10 includes pump 12, controller 14 (FIG. 1A), lubrication line 16 (FIG. 1A), lubricant injectors 18 (FIG. 1A), supply line 20 (FIG. 1A), and machinery 22 (FIG. 1A). Pump 12 includes reservoir 24, housing 26, motor 28, vent valve 30 (FIGS. 1B-1C), pressure relief valve 32 (FIGS. 1B-1C), gauge 34 (FIGS. 1B-1C), cylinder 36 (FIGS. 1B-1C), compression nut 38 (FIG. 1C), and end cap 40 (FIGS. 1B-1C). Housing 26 includes fluid inlet 42 (FIG. 1C), fluid outlet 44 (FIGS. 1B-1C), pressure path 46 (FIG. 1C), vent path 48 (FIG. 1C), pressure relief opening 50 (FIG. 1C), vent opening 52 (FIG. 1C), high-pressure region 54 (FIG. 1C), low-pressure region 56 (FIG. 1C), and reservoir receiving portion 57 (FIG. 1C). As shown in FIGS. 2A-2C, the upstream arrow indicates the upstream direction and the downstream arrow indicates the downstream direction.

Reservoir 24 is mounted on housing 26 at reservoir receiving portion 57 and is configured to store a supply of lubricant. Motor 28 is mounted on housing 26 and is configured to drive a piston, such as piston 60 (shown in FIGS. 2A-2B), in a reciprocating manner to drive lubricant downstream and pressurize the lubricant. Cylinder 36 is mounted in housing 26, and the piston is disposed within and reciprocates within cylinder 36. Compression nut 38 is mounted in housing 26 and is configured to secure cylinder 36 in housing 26. Compression nut 38 abuts cylinder 36 at interface 58. End cap 40 is attached to a portion of compression nut 38 extending out of housing 26. End cap 40 provides a sealed connection with housing 26 to prevent any lubricant from leaking out of housing 26.

Fluid inlet 42 extends through housing 26 between reservoir receiving portion 57 and cylinder 36. Fluid outlet 44 extends from high-pressure region 54 through housing 26 at a downstream end of cylinder 36. Similar to fluid outlet 44, pressure path 46 extends from high-pressure region 54 through housing 26 at the downstream end of cylinder 36. Pressure path 46 and fluid outlet 44 are fluidly connected by high-pressure region 54 such that lubricant flows to both pressure path 46 and fluid outlet 44 simultaneously, and both pressure path 46 and fluid outlet 44 experience the same fluid pressure. Gauge 34 is mounted on housing 26 and connected to pressure path 46. Gauge 34 is configured to provide an indication of the system pressure to the user.

Vent path 48 extends though housing between reservoir receiving portion 57 and low-pressure region 56. Vent path 48 extends into low-pressure region 56 at interface 58 between cylinder 36 and compression nut 38. As such, vent path 48 provides a fluid communication path between reservoir 24 and low-pressure region 56. Vent opening 52 extends through housing 26 between pressure path 46 and vent path 48. Pressure relief opening 50 similarly extends through housing 26 between pressure path 46 and vent path 48.

Vent valve 30 is mounted on housing 26 and extends into vent opening 52. Vent valve 30 is movable between an open position, where vent opening 52 is unsealed such that lubricant can flow between pressure path 46 and vent path 48 through vent opening 52, and a closed position, where vent opening 52 is sealed such that lubricant is prevented from flowing between pressure path 46 and vent path 48 through vent opening 52. In some examples, vent valve 30 is a normally-open valve that is configured to shift to the closed position during operation of pump 12 to build fluid pressure downstream of pump 12.

Pressure relief valve 32 is similarly mounted on housing 26 and extends into pressure relief opening 50. Pressure relief valve 32 is movable between an open position, where pressure relief opening 50 is unsealed such that lubricant can flow between pressure path 46 and vent path 48 through pressure relief opening 50, and a closed position, where pressure relief opening 50 is sealed such that lubricant is prevented from flowing between pressure path 46 and vent path 48 through pressure relief opening 50. Pressure relief valve 32 is a normally-closed valve that is configured to shift to the open position in response to the lubricant pressure reaching an operational limit.

Lubrication line 16 is connected to fluid outlet 44 and extends downstream from pump 12 to lubricant injectors 18. Supply line 20 extends from lubricant injectors 18 to machinery 22. Lubrication system 10 is a dedicated lubrication assembly for use with lubricated machinery 22 such as pumps, pistons, seals, bearings, and/or shafts. Reservoir 24 stores lubricant for distribution to lubricant injectors 18, and lubricant injectors 18 provide set amounts of lubricant to machinery 22 at specific locations. Controller 14 activates motor 28, causing the piston to reciprocate within cylinder 36. In some examples, motor 28 is an air motor such that controller 14 causes compressed air to flow to and power motor 28. In examples where motor 28 is an air motor, vent valve 30 can be a pneumatically-activated valve. As such, the compressed air flows to vent valve 30 to cause vent valve 30 to shift to the closed position to seal the fluid path through vent opening 52. While motor 28 is described as an air motor and vent valve 30 is described as a pneumatically-activated valve, it is understood that motor 28 and vent valve 30 can be of any desired configuration. For example, motor 28 and vent valve 30 can both or individually be hydraulically powered or electrically powered.

During a pressure cycle, lubricant is drawn into cylinder 36 through fluid inlet 42. The lubricant is driven downstream through cylinder 36 to pressure path 46 and fluid outlet 44. With both vent valve 30 and pressure relief valve 32 in the closed positions the pressurized lubricant within pressure path 46 is prevented from flowing to vent path 48. The lubricant is driven downstream to lubrication line 16 through fluid outlet 44. Lubrication line 16 provides the lubricant to lubricant injectors 18. Each lubricant injector 18 is configured to dispense a set volume of lubricant when the lubricant pressure in lubrication line 16 has reached a predetermined level. When the lubricant pressure reaches the predetermined level, the lubricant injector 18 is triggered and dispenses the set volume of lubricant to machinery 22 through supply line 20.

Vent path 48 provides a fluid flowpath between reservoir 24 and low-pressure region 56. As such, the lubricant can freely flow between low-pressure region 56 and reservoir 24 throughout operation. Low-pressure region 56 is isolated from high-pressure region by seals, such that low-pressure region 56 does not experience the lubricant pressure building in pressure path 46 and lubrication line 16. Vent path 48 provides lubricant from reservoir 24 to low-pressure region 56 to provide lubrication for components disposed in low-pressure region 56, such as second throat seal 74 (shown in FIGS. 2A-2B) and the second end of the piston. If the lubricant pressure exceeds a predetermined level, pressure relief valve 32 shifts to the open position to allow lubricant to vent to vent path 48 and thus to reservoir 24 through pressure relief opening 50, thereby causing the lubricant pressure in lubrication line 16 to drop.

After lubricant injectors 18 have dispensed lubricant, the lubricant pressure in lubrication line 16 is relieved to allow lubricant injectors 18 to reset for the next lubrication cycle. Pump 12 proceeds through a vent cycle to relieve the pressure in lubrication line 16. Motor 28 is deactivated and vent valve 30 shifts from the closed position to the open position. With vent valve 30 in the open position, the pressure differential causes the lubricant in lubrication line 16 to flow upstream and return to reservoir 24. The lubricant flows through lubrication line 16, into housing 26 through fluid outlet 44, to pressure path 46, to vent path 48 through vent opening 52, and back to reservoir 24. The lubricant pressure drops and lubricant injectors 18 reset for the next lubrication cycle.

FIG. 2A is a cross-sectional view of pump 12 taken along line 2-2 in FIG. 1B. FIG. 2B is an enlarged view of Detail Z in FIG. 2A. FIG. 2C is an enlarged view of Detail Y in FIG. 2B. FIGS. 2A-2C will be discussed together. Pump 12 includes reservoir 24, housing 26, motor 28, vent valve 30 (shown in FIGS. 1B-1C), pressure relief valve 32 (shown in FIGS. 1B-1C), gauge 34, cylinder 36, compression nut 38, end cap 40, piston 60, piston seal 62, intake seal 64, wiper seal 66, first bushing 68, first throat seal 70, second bushing 72, second throat seal 74, first annular flowpath 76, and second annular flowpath 78. Motor 28 includes motor piston 80 and rod 82. Housing 26 includes fluid inlet 42, fluid outlet 44 (shown in FIGS. 1B-1C), pressure path 46, vent path 48, pressure relief opening 50, vent opening 52, high-pressure region 54, low-pressure region 56, reservoir receiving portion 57, upstream cylinder bore 84, and downstream cylinder bore 86. Piston 60 includes first end 88 and second end 90. Cylinder 36 includes upstream end 92 and downstream end 94. Downstream end 94 of cylinder 36 includes outlet apertures 96 and cylinder orifices 98. Compression nut 38 includes shoulder 100, neck 102, nut orifices 104, cap receiving end 106, and bore 108. End cap 40 includes groove 110 and cap seal 112. Second throat seal 74 includes upstream face 114 and downstream face 116. Upstream arrow indicates the upstream direction and downstream arrow indicates the downstream direction.

Reservoir 24 is mounted on housing 26 at reservoir receiving portion 57 and is configured to store a volume of lubricant, such as grease and oil. Fluid inlet 42 and vent path 48 extend through housing 26 and are in fluid communication with reservoir 24. Vent path 48 extends through housing between reservoir receiving portion 57 and low-pressure region 56. Pressure path 46 extends through housing 26 to pressure gauge 34 from high-pressure region 54, and pressure path 46 is in unobstructed fluid communication with fluid outlet 44. Vent opening 52 extends through housing 26 between pressure path 46 and vent path 48. Vent valve 30 is mounted on housing 26 and is configured to seal and unseal vent opening 52 during operation. Pressure relief opening 50 also extends through housing 26 between pressure path 46 and vent path 48. Pressure relief valve 32 is mounted on housing 26 and is configured to seal and unseal pressure relief opening 50 during operation. Gauge 34 is mounted on housing 26 at a distal end of pressure path 46 and is configured to provide a pressure reading to the user.

Motor 28 is mounted on housing 26. Motor piston 80 is configured to oscillate and drive rod 82. Rod 82 extends from motor piston 80 and is connected to first end 88 of piston 60. As shown, motor 28 is an air motor, such that motor piston 80 is driven by compressed air. While motor 28 is described as an air motor, it is understood that motor 28 can be any suitable motor for driving piston 60 in a reciprocating manner, such as a hydraulic motor or electric motor.

Upstream end 92 and downstream end 94 of cylinder 36 are mounted in housing 26. Specifically, upstream end 92 is disposed in upstream cylinder bore 84 and downstream end 94 is disposed in downstream cylinder bore 86. Upstream end 92 of cylinder 36 is in fluid communication with fluid inlet 42, such that upstream end 92 receives lubricant from reservoir 24. Outlet apertures 96 extend through downstream end 94 of cylinder 36 and provide a flowpath for lubricant to exit cylinder 36 and flow to fluid outlet 44 and pressure path 46. Cylinder orifices 98 extend through downstream end 94 of cylinder 36 in low-pressure region 56 and are in fluid communication with vent path 48. Cylinder seal 118 is disposed around downstream end 94 of cylinder 36 and isolates outlet apertures 96 from cylinder orifices 98 such that lubricant cannot flow about cylinder 36 between outlet apertures 96 and cylinder orifices 98. While cylinder 36 is shown as including multiple components, it is understood that cylinder 36 can be made from as many or as few components as desired. In some examples, cylinder 36 is a unitary component. Cylinder seal 118 and second throat seal 74 divide downstream cylinder bore 86 into high-pressure region 54 and low-pressure region 56. It is understood that the terms high-pressure and low-pressure are relative terms indicating that the high-pressure region experiences a higher pressure than the low-pressure region during the pressure cycle. High-pressure region 54 and low-pressure region can experience approximately the same lubricant pressure when pump 12 is at rest.

Piston 60 extends through housing 26 and cylinder 36. Intake seal 64 and piston seal 62 are mounted on piston 60 and are configured to provide checks during operation, such that pump 12 is a double acting pump 12. First end 88 of piston 60 extends out of housing 26 through first bushing 68, first throat seal 70, and wiper seal 66 and is connected to rod 82. First bushing 68 provides a bearing surface for first end 88 of piston 60 during reciprocation of piston 60. First throat seal 70 extends about first end 88 of piston 60. Wiper seal 66 is mounted in housing 26 and extends about first end 88 of piston 60. Second end 90 of piston 60 extends through second bushing 72 and second throat seal 74 and into bore 108 of compression nut 38. Second bushing 72 is mounted in cylinder 36 and provides a bearing surface for second end 90 of piston 60 during reciprocation. Second throat seal 74 is mounted in cylinder 36 downstream of second bushing 72. Upstream face 114 of second throat seal 74 faces high-pressure region 54 and downstream face 116 of second throat seal 74 faces low-pressure region 56.

Compression nut 38 extends into low-pressure region 56 of downstream cylinder bore 86 of housing 26. Compression nut 38 is mounted to housing 26 and retains cylinder 36 within housing 26. In some examples, compression nut 38 is mounted to housing 26 by interfaced threading on compression nut 38 and housing 26. For example, compression nut 38 can include external threading configured to mate with internal threading on housing 26. With compression nut 38 mounted in housing 26, cap receiving end 106 of compression nut 38 extends out of housing 26. End cap 40 is mounted on cap receiving end 106. In some examples, end cap 40 can be mounted on compression nut 38 in the same manner as compression nut 38 is mounted to housing 26. For example, end cap 40 can include internal threading, similar to housing 26, configured to interface with the external threading on compression nut 38. It is understood, however, that end cap 40 can be connected to compression nut 38 in any desired manner, such as a press-fit connection. Cap seal 112 is disposed in groove 110 of end cap 40 and is disposed between end cap 40 and housing 26 to provide a sealed connection between end cap 40 and housing 26.

With compression nut 38 installed in housing 26, shoulder 100 abuts the distal portion of downstream end 94 of cylinder 36 to retain cylinder 36 within housing 26. Neck 102 extends from shoulder 100 into downstream end 94 of cylinder 36. A distal end of neck 102 abuts downstream face 116 of second throat seal 74 to retain second throat seal 74 within cylinder 36. Nut orifices 104 extend through neck 102 and provide a lubricant flowpath through compression nut 38.

Second throat seal 74 is disposed at interface 58 such that upstream face 114 of second throat seal 74 experiences the relatively high pumping pressures generated in high-pressure region 54, and downstream face 116 of second throat seal 74 experiences the relatively low pressures of the lubricant in low-pressure region 56. The lubricant pressure in low-pressure region 56 is approximately equal to the lubricant pressure in reservoir 24 as vent path 48 provides unobstructed fluid communication between low-pressure region 56 and reservoir 24. In some examples, second throat seal 74 is a u-cup seal with the lips of the u-cup facing upstream, such that upstream face 114 includes the lips of the u-cup. In such an example, the relatively high pressures in high-pressure region 54 exerted on upstream face 114 of second throat seal 74 facilitate sealing by energizing second throat seal 74. Second throat seal 74 and cylinder seal 118 divide downstream cylinder bore 86 into high-pressure region 54 and low-pressure region 56. High-pressure region 54 is disposed on the upstream side of second throat seal 74 and cylinder seal 118, and low-pressure region 56 is disposed on the downstream side of second throat seal 74 and cylinder seal 118.

First annular flowpath 76 is disposed in low-pressure region 56 at the interface between downstream end 94 of cylinder 36 and housing 26. First annular flowpath 76 extends circumferentially about downstream end 94 between downstream end 94 and housing 26. First annular flowpath 76 is in fluid communication with vent path 48 and cylinder orifices 98. Second annular flowpath is disposed between neck 102 of compression nut 38 and downstream end 94 of cylinder 36. Second annular flowpath 78 extends circumferentially about neck 102 and is in fluid communication with cylinder orifices 98 and nut orifices 104. As such, cylinder orifices 98 provide a flowpath for lubricant to flow between first annular flowpath 76 and second annular flowpath 78, and nut orifices 104 provide a flowpath for lubricant to flow between second annular flowpath 78 and bore 108. In some examples, cylinder orifices 98 and nut orifices 104 each have a diameter of about 0.23-0.26 cm (about 0.09-0.10 in.).

During operation, pump 12 proceeds through a pressure cycle, where pump 12 builds pressure in a lubrication line, such as lubrication line 16 (FIG. 1A), extending downstream from fluid outlet 44 to cause lubricant injectors, such as lubricant injectors (FIG. 1A) to dispense lubricant, and a vent cycle, where pump 12 vents the lubricant from the lubrication line, causing a drop in lubricant pressure and allowing the lubricant injectors to reset.

During the pressure cycle, motor 28 is activated and begins driving piston 60 in a reciprocating manner. Compressed air is alternatingly provided to opposite sides of motor piston 80 to cause motor piston 80 to reciprocate. Motor piston 80 thus drives rod 82 in a reciprocating manner, and rod 82 drives piston 60. In some examples, vent valve 30 is a normally open valve that is connected to the compressed air source. The compressed air activates vent valve 30 and causes vent valve 30 to shift to the closed position, such that vent valve 30 prevents lubricant from flowing through vent opening 52. Removing the air pressure from vent valve 30 causes vent valve 30 to shift back to the normally open position. While vent valve 30 is described as a pneumatically-operated valve, it is understood that vent valve 30 can be operated in any desired manner, such as hydraulically or electrically. It is understood, however, that vent valve 30 is closed whenever motor 28 is activated to build pressure in lubrication line 16 and open whenever motor 28 is deactivated to relieve pressure in the lubrication line. Pressure relief valve 32 is normally closed, but is configured to shift to the open position in response to the fluid pressure exceeding a maximum level.

Rod 82 drives piston 60 in a reciprocating manner. Piston 60 draws lubricant into upstream end 92 of cylinder 36 from reservoir 24 through fluid inlet 42. Piston 60 drives the lubricant through cylinder 36 and to downstream end 94 of cylinder 36 through intake seal 64 and piston seal 62. Intake seal 64 and piston seal 62 reciprocate within cylinder 36 along with piston 60 such that pump 12 is a double acting pump. The lubricant exits downstream end 94 of cylinder 36 through outlet apertures 96 and flows to both fluid outlet 44 and pressure path 46. Gauge 34 senses the fluid pressure in pressure path 46 and provides a pressure reading to the user. With vent valve 30 and pressure relief valve 32 in the closed positions, the lubricant is prevented from flowing into vent path 48 through vent opening 52 and pressure relief opening 50, respectively. The lubricant flowing through fluid outlet 44 flows downstream to lubricant applicators, such as injectors. Piston 60 continues to reciprocate to build pressure at the lubricant applicators until the lubricant applicators fire.

During the pressure cycle, second end 90 of piston 60 reciprocates through second throat seal 74. In some examples, piston 60 has a relatively short stroke and a quick cycle time, up to about 400 cycles per minutes. As piston 60 reciprocates and builds pressure, upstream face 114 of second throat seal 74 is subjected to the high pressures generated during pumping, while downstream face 116 of second throat seal 74 is isolated from the high pressure and is instead subjected to relatively low pressures in bore 108. With vent path 48 open between bore 108 and reservoir 24, the lubricant pressure in bore 108 and low-pressure region 56 is approximately equal to the lubricant pressure in reservoir 24.

Vent path 48 provides a lubricant flow path between bore 108 and reservoir 24, to provide lubrication to second throat seal 74 during pumping. Vent path 48 opens into reservoir receiving portion 57 such that vent path 48 is in fluid communication with reservoir 24. As such, the lubricant disposed in reservoir can freely flow through vent path 48 throughout operation. The lubricant flows through vent path 48 and enters first annular flowpath 76. First annular flowpath 76 provides a circumferential flowpath to allow the lubricant to flow fully around the portion of downstream end 94 of cylinder 36 disposed in low-pressure region 56. The lubricant flows into second annular flowpath 78 through cylinder orifices 98. From second annular flowpath 78 the lubricant flows through nut orifices 104 and into bore 108. As piston 60 reciprocates, second end 90 of piston 60 picks up the lubricant provided though vent path 48 and lubricates second throat seal 74. Vent path 48 remains open to both reservoir 24 and the downstream side of second throat seal 74 throughout operation, such that downstream face 116 of second throat seal 74 is exposed to lubricant from reservoir 24 throughout operation. As such, second throat seal 74 is actively lubricated throughout operation by the lubricant disposed in reservoir 24.

Having the open vent path 48 allows the lubricant to freely flow within vent path 48, which prevents piston 60 from generating undesired high pressure within bore 108 as second end 90 of piston 60 reciprocates within bore 108. As piston 60 is driven into bore 108 during a downstream stroke the lubricant is freely displaced through nut orifices 104, second annular flowpath 78, cylinder orifices 98, first annular flowpath 76, and vent path 48. As piston 60 is retracted from bore 108 during an upstream stroke, the lubricant freely flows back into the area of bore 108 vacated by piston 60, preventing a vacuum from forming in bore 108. As such, vent path 48, first annular flowpath 76, cylinder orifices 98, second annular flow path 78, and nut orifices 104 ensure that the desired, relatively low pressure is maintained in bore 108.

After the lubricant injectors dispense the lubricant, the pressure cycle is complete, motor 28 is deactivated, and pump 12 proceeds through the vent cycle to relieve pressure in the lubrication line and allow the lubricant injectors to reset. With motor 28 deactivated, vent valve 30 shifts to the open position. With vent valve 30 in the open position vent opening 52 is unsealed, such that vent path 48 and pressure path 46 are in fluid communication. The pressurized lubricant within the lubrication line backflows through the lubrication line and enters housing 26 through fluid outlet 44. The lubricant flows through pressure path 46, vent opening 52, and vent path 48 and back to reservoir 24.

Opening the flowpath between pressure path 46 and vent path 48, such as though vent opening 52 and/or pressure relief opening 50, creates an influx of high-pressure fluid into vent path 48. The influx of high-pressure fluid causes a pressure surge in vent path. Cylinder orifices 98 and nut orifices 104 are restrictive orifices sized to prevent downstream face 116 of second throat seal 74 from experiencing the full pressure surge. Preventing downstream face 116 of second throat seal 74 from experiencing the full pressure surge protects the integrity of second throat seal 74. In addition, the restrictive orifices provided by cylinder orifices 98 and nut orifices 104 prevent the pressure surge from causing cavitation in bore 108. As such, pump 12 self-regulates the pressure acting on downstream face 116 of second throat seal 74.

Pump 12 provides significant advantages. Vent path 48 provides a lubricant pathway for lubricant from reservoir 24 to flow to the downstream side of second throat seal 74 and provide lubrication to the downstream side of second throat seal 74. Providing lubricant to the downstream side of second throat seal 74 ensures that both second throat seal 74 and second end 90 of piston 60 receive sufficient lubrication, preventing undesired increases in friction which generate heat and wear. As such, lubricating the downstream side of second throat seal 74 increases the life of second throat seal 74, thereby reducing maintenance costs and downtime associated with maintenance. Cylinder orifices 98 and nut orifices 104 provide restrictive orifices that prevent second throat seal 74 from experiencing the full pressure surge generated during venting, thereby protecting the integrity of second throat seal 74 and preventing cavitation in the lubricant. Compression nut 38 retains cylinder 36 and second throat seal 74 in housing 26 while also providing a relatively low-pressure chamber in bore 108 for housing the supply of lubricant for second throat seal 74. Furthermore, the lubricant for second throat seal 74 is the same lubricant that is stored in reservoir 24, such that no dedicated, separate seal lubricant is required, saving costs. Vent path 48 is integrally formed in housing 26, which eliminates any additional plumbing that would have been required to route lubricant to the downstream side of second throat seal 74.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lubricant pump comprising:
   a housing having a fluid inlet and a fluid outlet;
   a reservoir mounted on the housing and configured to store a lubricant;
   a piston having a first end and a second end, the piston extending through the housing and configured to draw the lubricant through the fluid inlet and drive the lubricant through the fluid outlet;
   a throat seal disposed about the second end of the piston, the throat seal having an upstream face and a downstream face; and
   a vent path extending through the housing and configured to provide a flow path for the lubricant between the reservoir and a chamber on a downstream side of the throat seal to provide the lubricant to the downstream face of the throat seal, wherein the throat seal is spaced in an upstream direction from an intersection between the vent path and the chamber.

2. The lubricant pump of claim 1, further comprising:
   a cylinder mounted on the housing, an upstream end of the cylinder disposed in an upstream cylinder bore of the housing proximate the fluid inlet and a downstream end of the cylinder disposed in a downstream cylinder bore of the housing proximate the fluid outlet, wherein the downstream cylinder bore is divided into a high-pressure region and a low-pressure region;
   a compression nut extending into the low-pressure region of the downstream cylinder bore and connected to the housing, the compression nut abutting the downstream end of the cylinder;

wherein the vent path is fluidly connected to an interface between the compression nut and the cylinder.

3. The lubricant pump of claim 2, wherein the compression nut comprises:
   a central bore;
   a neck extending upstream and configured to be disposed within the downstream end of the cylinder;
   a shoulder extending radially from the neck; and
   a cap receiving end disposed opposite the shoulder.

4. The lubricant pump of claim 3, wherein the compression nut includes external threading configured to interface with internal threading on the housing.

5. The lubricant pump of claim 3, further comprising:
   an end cap connected to the cap receiving end and abutting the housing.

6. The lubricant pump of claim 5, wherein the end cap is connected to the compression nut by interfaced threading on the end cap and the compression nut.

7. The lubricant pump of claim 5, wherein the end cap includes an annular groove configured to receive a cap seal, the cap seal disposed between the end cap and the housing.

8. The lubricant pump of claim 3, further comprising:
   a cylinder orifice extending through the downstream end of the cylinder and in fluid communication with the vent path; and
   a nut orifice extending through the neck of the compression nut and in fluid communication with the cylinder orifice.

9. The lubricant pump of claim 8, wherein a nut orifice diameter is between 0.09-0.1 inches.

10. The lubricant pump of claim 8, further comprising:
    a first annular flow path disposed between the downstream end and the housing, the first annular flow path in fluid communication with the vent path and the cylinder orifice.

11. The lubricant pump of claim 10, further comprising:
    a second annular flow path disposed between the downstream end and the neck, the second annular flow path in fluid communication with the cylinder orifice and the nut orifice.

12. The lubricant pump of claim 2, further comprising:
    a cylinder seal extending around the downstream end of the cylinder and disposed between the downstream end of the cylinder and the housing and between the fluid outlet and the vent path.

13. The lubricant pump of claim 1, further comprising:
    a pressure path extending through the housing, wherein the pressure path is in unobstructed fluid communication with the fluid outlet;
    at least one opening extending between the pressure path and the vent path; and
    at least one valve movable between an open position, where the at least one valve allows the lubricant to flow through the at least one opening, and a closed position, where the at least one valve prevents the lubricant from flowing through the at least one opening.

14. The lubricant pump of claim 13, wherein:
    the at least one opening comprises:
    a vent opening extending between the pressure path and the vent path; and
    a pressure relief opening extending between the pressure path and the vent path; and
    the at least one valve comprises:
    a vent valve extending into the vent opening and configured to control the flow of lubricant through the vent opening; and a pressure relief valve extending into the pressure relief opening and configured to control the flow of lubricant through the pressure relief opening.

15. A lubrication system comprising:
a pump comprising:
   a housing having a fluid inlet and a fluid outlet;
   a reservoir mounted on the housing and configured to store a lubricant;
   a piston having a first end and a second end, the piston extending through the housing and configured to draw the lubricant through the fluid inlet and drive the lubricant through the fluid outlet, wherein the piston axially overlaps each of the fluid inlet and the fluid outlet both with the piston at an end of a first stroke in the downstream direction and with the piston at an end of a second stroke in the upstream direction;
   a motor attached to and configured to drive the piston;
   a throat seal disposed about the second end of the piston, the throat seal having an upstream face and a downstream face, wherein the throat seal fluidly separates a high-pressure region and a low-pressure region within the housing; and
   a vent path extending through the housing and configured to provide a flow path for the lubricant between the reservoir and the downstream face of the throat seal, wherein the vent path is fluidly connected to the low-pressure region;
a lubrication line extending from the fluid outlet;
a lubricant injector disposed on the lubrication line and configured to receive the lubricant from the lubrication line; and
a controller configured to alternatingly activate the motor to initiate a pressure cycle and to deactivate the motor to initiate a vent cycle.

16. The lubrication system of claim 15, wherein the housing further comprises:
   a pressure path extending through the housing, wherein the pressure path is in unobstructed fluid communication with the fluid outlet;
   at least one opening extending between the pressure path and the vent path; and
   at least one valve movable between an open position, where the at least one valve allows the lubricant to flow through the at least one opening, and a closed position, where the at least one valve prevents the lubricant from flowing through the at least one opening.

17. The lubrication system of claim 16, wherein:
the at least one opening comprises:
   a vent opening extending between the pressure path and the vent path; and
   a pressure relief opening extending between the pressure path and the vent path;
the at least one valve comprises:
   a vent valve extending into the vent opening and configured to control the flow of lubricant through the vent opening; and
   a pressure relief valve extending into the pressure relief opening and configured to control the flow of lubricant through the pressure relief opening; and
the vent valve configured to shift to an open position to allow the lubricant to flow through the vent opening to vent the lubricant pressure in the lubrication line during the vent cycle.

18. The lubrication system of claim 15, further comprising:
   a cylinder mounted on the housing, the cylinder comprising:
      an upstream end disposed in an upstream cylinder bore of the housing proximate the fluid inlet;
      a downstream end disposed in a downstream cylinder bore of the housing proximate the fluid outlet and the pressure path;
      a cylinder orifice extending through the downstream end of the cylinder;
   a cylinder seal is disposed about the downstream end of the cylinder, the cylinder seal and the throat seal dividing the downstream cylinder bore into a high-pressure region and a low-pressure region;
   a compression nut extending into the low-pressure region of the downstream cylinder bore and connected to the housing, wherein the compression nut comprises:
      a central bore;
      a neck extending upstream and disposed within the downstream end of the cylinder;
      a nut orifice extending through the neck
      a shoulder extending radially from the neck, the shoulder abutting the downstream end of the cylinder; and
      a cap receiving end disposed opposite the shoulder; and
   an end cap mounted on the cap receiving end of the compression nut, the end cap enclosing the bore;
   wherein the cylinder orifice and the nut orifice are disposed in the low-pressure region and in fluid communication with the vent path.

19. The lubrication system of claim 18, further comprising:
   a first annular flow path disposed between the downstream end and the housing, the first annular flow path in fluid communication with the vent path and the cylinder orifice; and
   a second annular flow path disposed between the downstream end and the neck, the second annular flow path in fluid communication with the cylinder orifice and the nut orifice.

20. A lubricant pump comprising:
a housing having a fluid inlet and a fluid outlet;
a reservoir mounted on the housing and configured to store a lubricant;
a piston having a first end and a second end, the piston extending through the housing and configured to draw the lubricant through the fluid inlet and drive the lubricant through the fluid outlet;
a throat seal disposed about the second end of the piston, the throat seal having an upstream face and a downstream face;
a vent path extending through the housing and configured to provide a flow path for the lubricant between the reservoir and the downstream face of the throat seal;
a cylinder mounted on the housing, an upstream end of the cylinder disposed in an upstream cylinder bore of the housing proximate the fluid inlet and a downstream end of the cylinder disposed in a downstream cylinder bore of the housing proximate the fluid outlet, wherein the downstream cylinder bore is divided into a high-pressure region and a low-pressure region; and
a compression nut extending into the low-pressure region of the downstream cylinder bore and connected to the housing, the compression nut abutting the downstream end of the cylinder;
wherein the vent path is fluidly connected to an interface between the compression nut and the cylinder.

21. A lubrication system comprising:
a pump comprising:
  a housing having a fluid inlet and a fluid outlet;
  a reservoir mounted on the housing and configured to store a lubricant;
  a piston having a first end and a second end, the piston extending through the housing and configured to draw the lubricant through the fluid inlet and drive the lubricant through the fluid outlet;
  a motor attached to and configured to drive the piston;
  a throat seal disposed about the second end of the piston, the throat seal having an upstream face and a downstream face; and
  a vent path extending through the housing and configured to provide a flow path for the lubricant between the reservoir and the downstream face of the throat seal;
  a cylinder mounted on the housing, the cylinder comprising:
    an upstream end disposed in an upstream cylinder bore of the housing proximate the fluid inlet;
    a downstream end disposed in a downstream cylinder bore of the housing proximate the fluid outlet and the pressure path;
    a cylinder orifice extending through the downstream end of the cylinder;
  a cylinder seal is disposed about the downstream end of the cylinder, the cylinder seal and the throat seal dividing the downstream cylinder bore into a high-pressure region and a low-pressure region;
  a compression nut extending into the low-pressure region of the downstream cylinder bore and connected to the housing, wherein the compression nut comprises:
    a central bore;
    a neck extending upstream and disposed within the downstream end of the cylinder;
    a nut orifice extending through the neck
    a shoulder extending radially from the neck, the shoulder abutting the downstream end of the cylinder; and
    a cap receiving end disposed opposite the shoulder; and
  an end cap mounted on the cap receiving end of the compression nut, the end cap enclosing the bore;
  wherein the cylinder orifice and the nut orifice are disposed in the low-pressure region and in fluid communication with the vent path a lubrication line extending from the fluid outlet;
a lubricant injector disposed on the lubrication line and configured to receive the lubricant from the lubrication line; and
a controller configured to alternatingly activate the motor to initiate a pressure cycle and to deactivate the motor to initiate a vent cycle.

* * * * *

UNITED STATES PATENT AND TRADEMARK OFFICE
CERTIFICATE OF CORRECTION

PATENT NO. : 10,774,830 B2
APPLICATION NO. : 15/944067
DATED : September 15, 2020
INVENTOR(S) : Jesse L. Lanie and Dustin A. Tichy

Page 1 of 1

It is certified that error appears in the above-identified patent and that said Letters Patent is hereby corrected as shown below:

In the Specification

Column 2, Line 17:
Delete "yin"
Insert --y in--

Signed and Sealed this
Thirteenth Day of October, 2020

Andrei Iancu
*Director of the United States Patent and Trademark Office*